United States Patent
Yamamoto et al.

(10) Patent No.: US 9,956,892 B2
(45) Date of Patent: May 1, 2018

(54) ELECTRICALLY POWERED VEHICLE AND METHOD OF CONTROLLING ELECTRICALLY POWERED VEHICLE

(71) Applicants: Masaya Yamamoto, Kasugai (JP); Jun Yasue, Toyota (JP)

(72) Inventors: Masaya Yamamoto, Kasugai (JP); Jun Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 14/379,006

(22) PCT Filed: Feb. 28, 2013

(86) PCT No.: PCT/JP2013/055380
§ 371 (c)(1),
(2) Date: Aug. 15, 2014

(87) PCT Pub. No.: WO2013/133120
PCT Pub. Date: Sep. 12, 2013

(65) Prior Publication Data
US 2016/0001676 A1 Jan. 7, 2016

(30) Foreign Application Priority Data
Mar. 9, 2012 (JP) .................. 2012-053030

(51) Int. Cl.
B60L 15/20 (2006.01)
B60L 3/00 (2006.01)
(Continued)

(52) U.S. Cl.
CPC ......... *B60L 15/2045* (2013.01); *B60L 3/0046* (2013.01); *B60L 11/1803* (2013.01);
(Continued)

(58) Field of Classification Search
USPC .......................................... 701/22
See application file for complete search history.

(56) References Cited

U.S. PATENT DOCUMENTS 3,899,732 A * 8/1975 Staby ................. G01R 31/3631
324/429
5,459,390 A * 10/1995 Tomazic ............ G01R 31/3631
320/134
(Continued)

FOREIGN PATENT DOCUMENTS

JP  A-09-098502   4/1997
JP  A-2004-023810  1/2004

*Primary Examiner* — Jean Paul Cass
(74) *Attorney, Agent, or Firm* — Oliff PLC

(57) ABSTRACT

An electrically powered vehicle includes a power storage device, a motor, a limitation control unit, a notification unit, and a changing unit. The motor generates traveling driving power using electric power output from the power storage device. The limitation control unit limits possible output power, which indicates electric power able to be output from the power storage device, based on a load state of the power storage device. The notification unit notifies a warning when the possible output power is smaller than a threshold value for notifying a driver of decrease of the traveling driving power. The changing unit increases, when the load state of the power storage device is high, the threshold value to be larger than the threshold value when the load state of the power storage device is low.

11 Claims, 5 Drawing Sheets

(51) Int. Cl.
*B60L 11/18* (2006.01)
*H02J 7/00* (2006.01)

(52) U.S. Cl.
CPC ........... *B60L 15/20* (2013.01); *B60L 15/2009* (2013.01); *H02J 7/0047* (2013.01); *B60L 2210/14* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2250/10* (2013.01); *B60L 2250/16* (2013.01); *H02J 2007/005* (2013.01); *H02J 2007/0067* (2013.01); *Y02T 10/645* (2013.01); *Y02T 10/7005* (2013.01); *Y02T 10/7225* (2013.01); *Y02T 10/7275* (2013.01)

(56) References Cited

U.S. PATENT DOCUMENTS

| | | | | |
|---|---|---|---|---|
| 5,596,262 | A * | 1/1997 | Boll | B60L 11/12 320/DIG. 21 |
| 5,821,697 | A * | 10/1998 | Weber | H05B 39/09 315/200 A |
| 5,949,219 | A * | 9/1999 | Weiss | G01N 21/31 320/136 |
| 6,167,309 | A * | 12/2000 | Lyden | A61N 1/3708 607/29 |
| 6,700,213 | B1 * | 3/2004 | Wakashiro | B60K 6/485 180/65.1 |
| 2001/0034541 | A1 * | 10/2001 | Lyden | A61N 1/3708 607/29 |
| 2002/0192519 | A1 | 12/2002 | Fujita et al. | |
| 2003/0034780 | A1 * | 2/2003 | Vacher | B60L 11/1851 324/427 |
| 2003/0094321 | A1 * | 5/2003 | Hirata | B60L 11/1851 180/65.245 |
| 2005/0279541 | A1 * | 12/2005 | Peters | B60K 7/0007 180/65.1 |
| 2006/0019578 | A1 * | 1/2006 | Yamane | B24B 49/16 451/8 |
| 2006/0021808 | A1 * | 2/2006 | McGee | B60K 6/445 180/65.235 |
| 2006/0196714 | A1 * | 9/2006 | Sugimoto | B60K 6/44 180/242 |
| 2006/0285315 | A1 * | 12/2006 | Tufenkjian | A61B 90/35 362/105 |
| 2007/0052423 | A1 * | 3/2007 | Arai | G01R 31/3624 324/429 |
| 2007/0150136 | A1 * | 6/2007 | Doll | B60T 8/885 701/29.2 |
| 2008/0053715 | A1 * | 3/2008 | Suzuki | B60L 11/1861 180/2.1 |
| 2008/0074082 | A1 * | 3/2008 | Tae | B60L 11/1862 320/136 |
| 2008/0145746 | A1 * | 6/2008 | Zappi | H01M 2/1646 429/51 |
| 2010/0280697 | A1 * | 11/2010 | Yanagisawa | B60W 10/08 701/22 |
| 2011/0206977 | A1 * | 8/2011 | Ikeda | H01M 2/0257 429/156 |
| 2011/0260546 | A1 * | 10/2011 | Hashizume | B60K 6/46 307/75 |
| 2011/0309799 | A1 * | 12/2011 | Firehammer | H02J 7/0016 320/134 |
| 2013/0035823 | A1 * | 2/2013 | Yoshida | B60T 1/10 701/31.5 |
| 2013/0127420 | A1 * | 5/2013 | Cho | H02J 7/00 320/128 |
| 2013/0190958 | A1 * | 7/2013 | Izumi | B60W 20/20 701/22 |
| 2015/0105947 | A1 * | 4/2015 | Chang | B60L 11/1861 701/22 |
| 2016/0137184 | A1 * | 5/2016 | Hokoi | B60W 50/0097 701/22 |

* cited by examiner

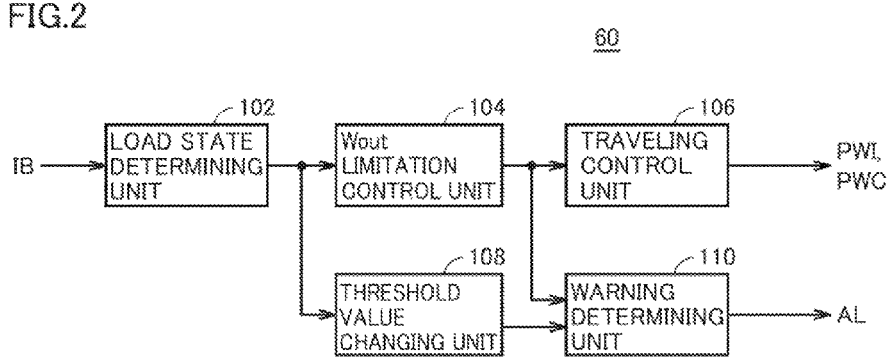
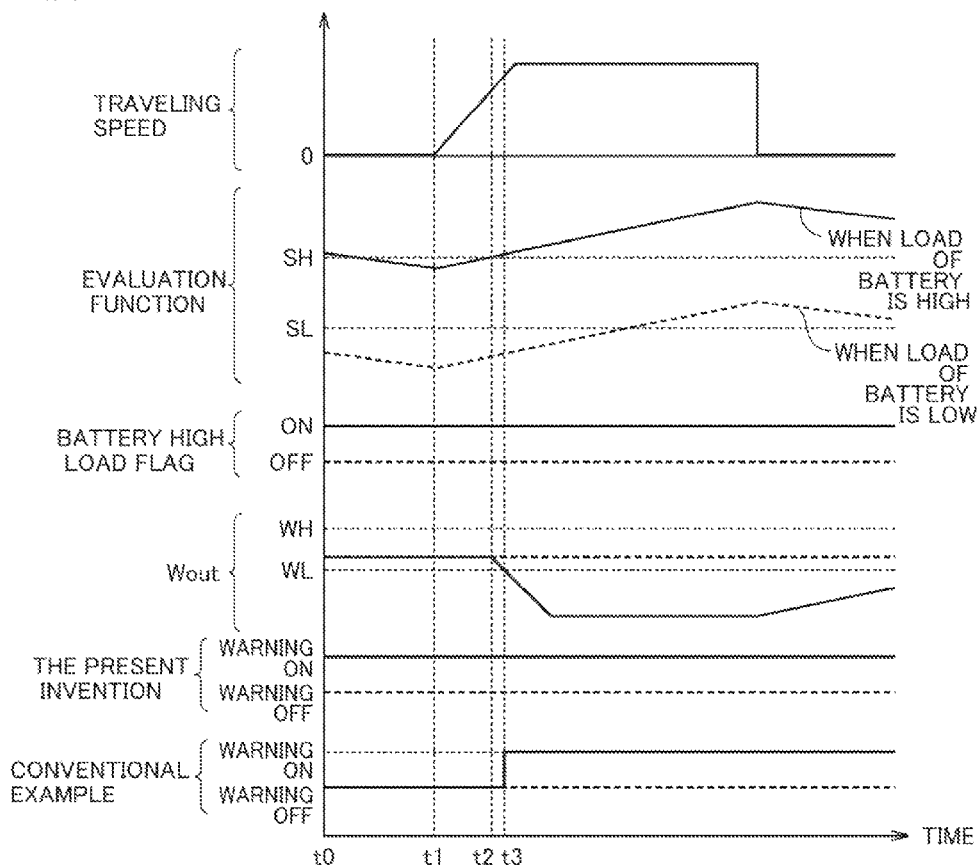

FIG.6

|  |  | REQUESTED DRIVING POWER | | |
|---|---|---|---|---|
|  |  | P1 | P2 | P3 |
| EVALUATION FUNCTION | S1 | WL | WL | WH |
|  | S2 | WL | WL | WH |
|  | S3 | WH | WH | WH |

FIG.7

|  |  | REQUESTED DRIVING POWER | | |
|---|---|---|---|---|
|  |  | P1 | P2 | P3 |
| EVALUATION FUNCTION | S1 | WL | WL | WL |
|  | S2 | WL | WL | WL |
|  | S3 | WL | WL | WH |

FIG.8

|  |  | REQUESTED DRIVING POWER | | |
|---|---|---|---|---|
|  |  | P1 | P2 | P3 |
| EVALUATION FUNCTION | S1 | A | B | C |
|  | S2 | D | E | F |
|  | S3 | G | H | I |

ELECTRICALLY POWERED VEHICLE AND METHOD OF CONTROLLING ELECTRICALLY POWERED VEHICLE

TECHNICAL FIELD

The present invention relates to an electrically powered vehicle and a method of controlling the electrically powered vehicle, in particular, an electrically powered vehicle including a power storage device storing electric power for traveling, and a method of controlling the electrically powered vehicle.

BACKGROUND ART

Japanese Patent Laying-Open No. 2004-23810 (Patent Document 1) discloses an electric vehicle that notifies a driver that limitation on output of a motor will be performed. In this electric vehicle, when it is detected that there is a malfunction or high possibility of malfunction in various types of devices included therein, the driver is notified that there is a high possibility of limiting the output of the motor. Accordingly, the driver understands that there is a high possibility of limiting the output of the motor before the limitation on the output of the motor is performed (see Patent Document 1).

CITATION LIST

Patent Document

PTD 1: Japanese Patent Laying-Open No. 2004-23810
PTD 2: Japanese Patent Laying-Open No. 9-98502

SUMMARY OF INVENTION

Technical Problem

An electrically powered vehicle that travels using driving power from a motor includes a power storage device, such as a battery, so as to store electric power, which is to be supplied to the motor. Possible output power Wout, which represents electric power that can be output by the power storage device, may be limited by a load state (such as state of charge, input/output current, or temperature) of the power storage device. On this occasion, it is preferable to notify the user that traveling driving power will be decreased.

In the electrically powered vehicle described above, possible output power Wout when the load state of the power storage device is high may be limited as compared with that when the load state of the power storage device is low. In this case, when the driver performs an acceleration operation while the load state of the power storage device is high, the driver is immediately notified that the driving power will be limited and therefore feels bothersome. This point is not particularly taken into consideration in the electric vehicle disclosed in the above-described publication.

Accordingly, the present invention has an object to provide an electrically powered vehicle that notifies a driver in advance that traveling driving power will be decreased due to a limitation on possible output power of a power storage device.

The present invention has another object to provide a method of controlling an electrically powered vehicle that notifies a driver in advance that traveling driving power will be decreased due to a limitation on possible output power of a power storage device.

Solution to Problem

According to the present invention, an electrically powered vehicle includes a power storage device, a motor, a limitation control unit, a notification unit, and a changing unit. The motor generates traveling driving power using electric power output from the power storage device. The limitation control unit limits possible output power, which indicates electric power able to be output from the power storage device, based on a load state of the power storage device. The notification unit notifies a warning when the possible output power is smaller than a threshold value for notifying a driver of decrease of the traveling driving power. The changing unit increases, when the load state of the power storage device is high, the threshold value to be larger than the threshold value when the load state of the power storage device is low.

Preferably, the electrically powered vehicle further includes a determining unit. The determining unit determines the load state of the power storage device based on a predetermined evaluation function indicating a state of the power storage device.

Preferably, the electrically powered vehicle further includes a determining unit. The determining unit determines the load state of the power storage device based on the traveling driving power.

Preferably, the electrically powered vehicle further includes a determining unit. The determining unit determines the load state of the power storage device based on a predetermined evaluation function, which indicates a state of the power storage device, and the traveling driving power.

More preferably, the evaluation function is an evaluation function that is based on an input/output current of the power storage device.

More preferably, the evaluation function is an evaluation function that is based on an integrated value of the input/output current.

Preferably, the electrically powered vehicle further includes a determining unit. The determining unit determines the load state of the power storage device based on an amount of limitation on the possible output power.

Preferably, the electrically powered vehicle further includes a determining unit. The determining unit determines the load state of the power storage device based on the traveling driving power or a history of an amount of operation on an accelerator pedal.

Preferably, the changing unit increases the threshold value more as the load state of the power storage device is higher.

Further, according to the present invention, a method of controlling an electrically powered vehicle is a method of controlling an electrically powered vehicle including a power storage device and a motor that generates traveling driving power using electric power output from the power storage device. The method includes the steps of: limiting possible output power, which indicates electric power able to be output from the power storage device, based on a load state of the power storage device; notifying a warning when the possible output power is smaller than a threshold value for notifying a driver of decrease of the traveling driving power; and increasing, when the load state of the power storage device is high, the threshold value to be larger than the threshold value when the load state of the power storage device is low.

Advantageous Effects of Invention

In the present invention, when the load state of the power storage device is high, the threshold value for notifying the driver of the limitation on the traveling driving power is made larger than that in the case where the load state of the power storage device is low. Accordingly, when the load state of the power storage device is high, the driver can be notified in advance that the possible output power of the power storage device will be limited. Thus, according to the present invention, there can be provided an electrically powered vehicle that can notify a driver in advance that traveling driving power will be decreased due to a limitation on possible output power of a power storage device.

BRIEF DESCRIPTION OF DRAWINGS

FIG. 2 is a function block diagram of a control device shown in FIG. 1.

FIG. 3 is a time chart showing warning determination according to the first embodiment.

FIG. 6 is a table illustrating a warning determination threshold value stored in a memory by the control device according to the second embodiment.

FIG. 7 is a table illustrating the warning determination threshold value stored in the memory by the control device according to the second embodiment.

FIG. 8 is a table illustrating the warning determination threshold value stored in the memory by the control device according to the second embodiment.

DESCRIPTION OF EMBODIMENTS

Figure 1:
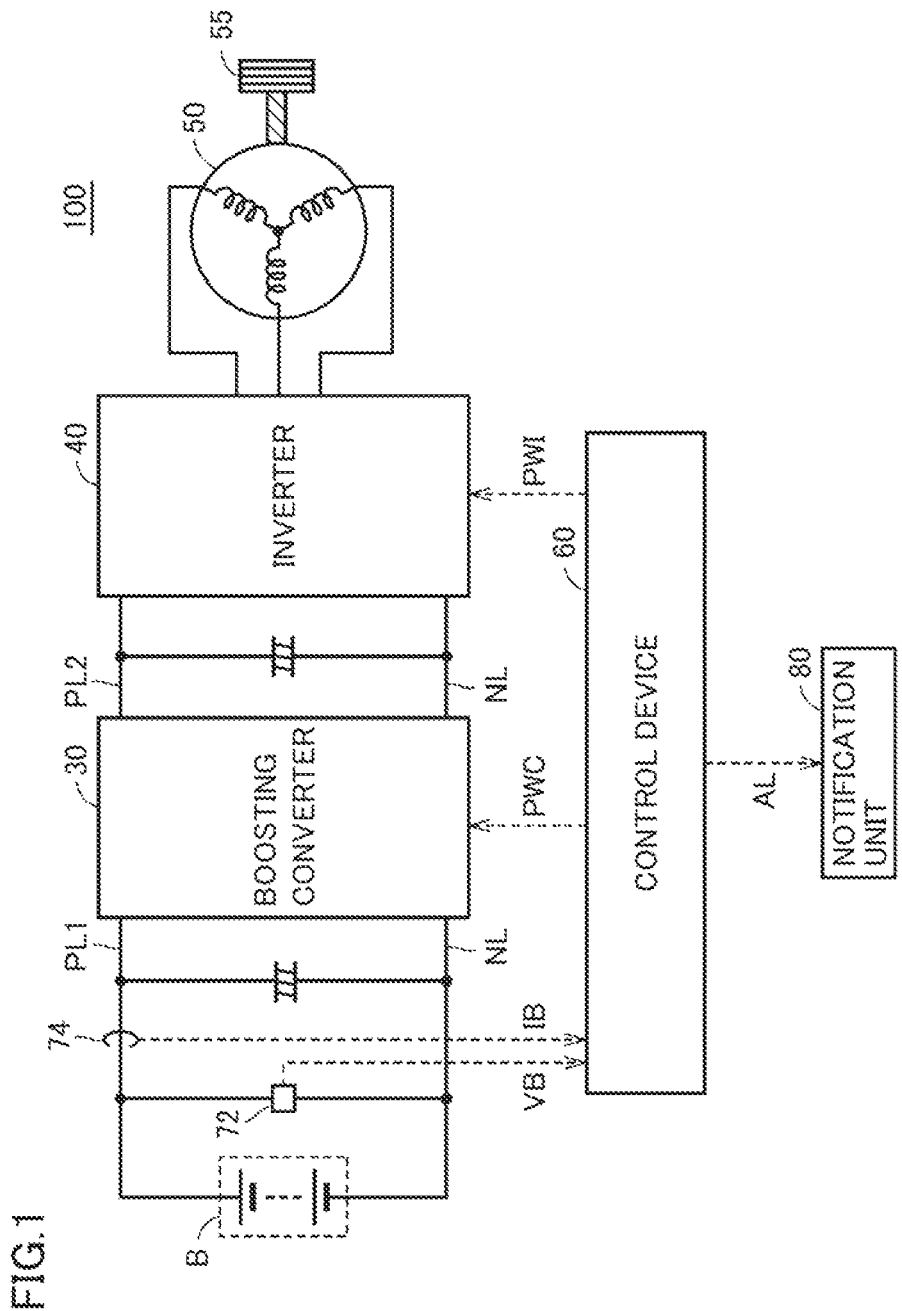
FIG. 1 is an overall block diagram of an electrically powered vehicle according to a first embodiment of the present invention.

The following describes an embodiment of the present invention in detail with reference to figures. It should be noted that the same reference characters are given to the same or corresponding portions in the figures and are not described repeatedly.

[First Embodiment]

FIG. 1 is an overall block diagram of an electrically powered vehicle according to a first embodiment of the present invention. Referring to FIG. 1, electrically powered vehicle 100 includes a battery B, a voltage sensor 72, a current sensor 74, a boosting converter 30, an inverter 40, a motor generator 50, a driving wheel 55, a control device 60, and a notification unit 80.

Battery B is a rechargeable DC power source, and is constructed of a secondary battery such as a nickel hydride battery or a lithium ion battery. Battery B stores electric power for traveling, and supplies the electric power to boosting converter 30. On the other hand, during braking of electrically powered vehicle 100, battery B receives and is charged with electric power generated by motor generator 50.

Voltage sensor 72 detects output voltage VB of battery B, and outputs a detection value thereof to control device 60. Current sensor 74 detects a current IB flowing in battery B, and outputs a detection value thereof to control device 60.

Boosting converter 30 is provided between battery B and inverter 40. Boosting converter 30 boosts a voltage (hereinafter, referred to as "system voltage") between positive electrode line PL2 and negative electrode line NL based on a signal PWC from control device 60 such that the voltage becomes equal to or more than the output voltage of battery B. Boosting converter 30 is constructed of a current reversible chopper circuit including: a reactor connected to positive electrode line PL1; and upper and lower arms connected in series between positive electrode line PL2 and negative electrode line NL, for example.

Inverter 40 is provided between boosting converter 30 and motor generator 50. Based on signal PWI from control device 60, inverter 40 converts the DC power, which is supplied from boosting converter 30, into three-phase AC power and outputs it to motor generator 50, thereby driving motor generator 50. Further, during braking of electrically powered vehicle 100, inverter 40 converts three-phase AC power generated by motor generator 50 into DC power based on signal PWI, and outputs it to positive electrode line PL2. Inverter 40 is constructed of a bridge circuit including switching elements corresponding to the three phases, for example.

Motor generator 50 is an AC motor generator mechanically coupled to driving wheel 55, such as a three-phase AC synchronous motor generator. Motor generator 50 is driven by inverter 40, and generates driving power for traveling. Further, during braking of electrically powered vehicle 100, motor generator 50 receives kinetic energy of the vehicle from driving wheel 55 to generate electric power. It should be noted that in the case where electrically powered vehicle 100 is a hybrid vehicle, motor generator 50 may be incorporated in the hybrid vehicle as a component that is mechanically coupled to the engine not shown in the figure, that generates electric power using motive power of the engine, and that starts the engine.

Control device 60 generates a signal PWC for driving boosting converter 30 based on the system voltage or output voltage VB of battery B. Control device 60 outputs the generated signal PWC to boosting converter 30. It should be noted that the system voltage is detected by a voltage sensor not shown in the figure.

Further, control device 60 controls possible output power Wout of battery B based on the state of charge and load state of battery B. Possible output power Wout represents electric power that can be output by battery B, and is varied according to the state of charge and load state of battery B.

Moreover, control device 60 generates signal PWI for driving motor generator 50 based on an amount of operation on the accelerator pedal, a vehicle speed, and possible output power Wout. Control device 60 outputs the generated signal PWI to inverter 40.

Moreover, control device 60 determines whether or not there is a possibility of limiting the traveling driving power of electrically powered vehicle 100. When it is determined that there is a possibility of limiting the traveling driving power of electrically powered vehicle 100, control device 60 outputs a signal to notification unit 80.

Based on a signal received from control device 60, notification unit 80 presents a warning on a display so as to indicate, to the driver, that there is a possibility of limiting the traveling driving power of electrically powered vehicle 100. Instead of this, notification unit 80 may notify the warning by means of illumination of a lamp. Alternatively, notification unit 80 may notify the warning by means of a buzzer that provides a warning sound.

FIG. 2 is a function block diagram for illustrating the configuration of control device 60 shown in FIG. 1 in detail. Referring to FIG. 2, control device 60 includes a load state determining unit 102, a Wout limitation control unit 104, a traveling control unit 106, a threshold value changing unit 108, and a warning determining unit 110.

Load state determining unit 102 determines whether or not the load state of battery B is high, based on a predetermined evaluation function that indicates the load state of battery B. The load state of battery B is a state representing, for example, the state of charge, input/output current, temperature, or the like of battery B. The load state of battery B becomes higher as charging/discharging capability of battery B is used more. The evaluation function is calculated by, for example, multiplying the value indicating the input/output current of battery B detected by current sensor 74 by a predetermined coefficient. When the evaluation function is equal to or higher than high load determination threshold value SH for determining whether or not the load state of battery B is high, load state determining unit 102 turns on a battery high load flag indicating that battery B is in a high load state. On the other hand, when the evaluation function is equal to or less than a low load determination threshold value SL for determining whether or not the load state of battery B is low, load state determining unit 102 turns off the battery high load flag. Load state determining unit 102 outputs the battery high load flag to Wout limitation control unit 104 and threshold value changing unit 108.

Wout limitation control unit 104 calculates possible output power Wout, which indicates electric power that can be output by battery B, based on the state of charge (hereinafter, also referred to as "SOC (State Of Charge)"), temperature, and the like of battery B. It should be noted that the SOC of battery B can be calculated by various well-known methods employing output voltage VB and current IB of battery B. When the battery high load flag received from load state determining unit 102 is on, Wout limitation control unit 104 limits possible output power Wout of battery B. Wout limitation control unit 104 outputs possible output power Wout to traveling control unit 106 and warning determining unit 110.

Traveling control unit 106 calculates a requested torque requested to motor generator 50, based on the amount of operation of the accelerator pedal. Traveling control unit 106 calculates requested power requested to motor generator 50, based on the vehicle speed and the requested torque. When the requested power is more than possible output power Wout, traveling control unit 106 limits the requested power to possible output power Wout. Traveling control unit 106 calculates a torque command value of motor generator 50 based on the requested power limited not to exceed possible output power Wout.

Traveling control unit 106 generates a PWM (Pulse Width Modulation) signal for driving inverter 40 so as to cause motor generator 50 to output the motor torque indicated by the torque command value, and outputs it to inverter 40 as signal PWI. Further, traveling control unit 106 generates a PWM signal for driving boosting converter 30 to obtain a desired system voltage, and outputs it to boosting converter 30 as signal PWC.

Threshold value changing unit 108 sets a warning determination threshold value. The warning determination threshold value is to notify the driver that the traveling driving power will be limited. When the load state of battery B is high, threshold value changing unit 108 increase the warning determination threshold value to be larger than the threshold value when the load state of battery B is low. Specifically, when the battery high load flag received from load state determining unit 102 is on, threshold value changing unit 108 sets the warning determination threshold value at a high load threshold value WH. On the other hand, when the battery high load flag is off, threshold value changing unit 108 sets the warning determination threshold value at a low load threshold value WL. Here, for high load threshold value WH, a value larger than low load threshold value WL is set in advance. Threshold value changing unit 108 outputs a warning determination threshold value to warning determination unit 110. It should be noted that threshold value changing unit 108 may set the warning determination threshold value such that the warning determination threshold value becomes larger as the load state of battery B is higher.

When possible output power Wout of battery B received from Wout limitation control unit 104 is smaller than the warning determination threshold value received from threshold value changing unit 108, warning determination unit 110 activates a signal AL indicating that there is a possibility of limiting the traveling driving power of electrically powered vehicle 100. Warning determination unit 110 outputs signal AL to notification unit 80. When signal AL received from warning determination unit 110 is activated, notification unit 80 presents, to the driver on the display, a warning indicating that there is a possibility of limiting the traveling driving power of electrically powered vehicle 100.

FIG. 3 is a time chart showing the warning determination according to the first embodiment. In FIG. 3, the horizontal axis represents time and the vertical axis represents the traveling speed, the evaluation function, the battery high load flag, possible output power Wout, and the warning state. It should be noted that a case where the load state of battery B is high is indicated by a solid line, and a case where the load state of battery B is low is indicated by a broken line.

Referring to FIG. 3, the following first describes the case where the load state of battery B is low. Since the evaluation function is smaller than low load determination threshold value SL at time t0, control device 60 turns off the battery high load flag. Accordingly, the warning determination threshold value is set at low load threshold value WL. Since possible output power Wout is larger than low load threshold value WL, control device 60 turns off the warning state. It should be noted that the expression "turn off the warning state" is intended to indicate that the driver is not notified of the warning by deactivating signal AL, and the expression "turn on the warning state" is intended to indicate that the driver is notified of the warning by activating signal AL.

At time t1, electrically powered vehicle 100 starts to travel from its stopped state. Accordingly, the electric power stored in battery B is consumed after time t1, thereby gradually increasing the load state of the battery. However, the evaluation function does not exceed high load determination threshold value SH, so that the battery high load flag is maintained to be off. Accordingly, the warning determination threshold value is maintained at low load threshold value WL. Since the load state of battery B is low, possible output power Wout is not limited. Therefore, possible output power Wout does not become smaller than the warning determination threshold value, so that the warning state is maintained to be off.

Next, the following describes the case where the load state of battery B is high. At time t0, the evaluation function is larger than high load determination threshold value SH, so that control device 60 turns on the battery high load flag. Accordingly, the warning determination threshold value is set at high load threshold value WH. On this occasion, possible output power Wout is smaller than high load threshold value WH, so that control device 60 turns on the warning state.

At time t1, the evaluation function becomes smaller than high load determination threshold value SH. However, the evaluation function is larger than low load determination threshold value SL, so that the battery high load flag is maintained to be on. Therefore, the warning determination threshold value is maintained at high load threshold value WH. On this occasion, electrically powered vehicle 100 starts to travel from its stopped state. Accordingly, the electric power stored in battery B is consumed, thereby gradually increasing the load state of the battery.

When the evaluation function exceeds high load determination threshold value SH at time t2, possible output power Wout is limited. However, the threshold value for determining whether to limit possible output power Wout may be a value different from high load determination threshold value SH.

Thus, in the embodiment of the present invention, when the load state of battery B is low, possible output power Wout is not limited after time t0, so that the driver is not notified of a warning. Meanwhile, when the load state of battery B is high, the warning state becomes on before electrically powered vehicle 100 is accelerated (time t0). Accordingly, before the driver operates to accelerate electrically powered vehicle 100 to result in a limitation on possible output power Wout, the driver can be informed in advance that there is a high possibility of limiting the driving power of electrically powered vehicle 100.

Meanwhile, in the conventional example, irrespective of the load state of battery B, the warning determination threshold value is set at threshold value WL. Accordingly, when the load state of battery B is low, the driver is not notified of a warning as with the embodiment of the present invention.

On the other hand, when the load state of battery B is high, possible output power Wout is larger than threshold value WL at time t0, so that the warning state is turned off.

When electrically powered vehicle 100 starts to travel from the stopped state at time t1, electric power stored in battery B is consumed, thereby gradually increasing the load state of the battery.

When the evaluation function exceeds high load determination threshold value SH at time t2, possible output power Wout is limited.

At time t3, possible output power Wout thus limited becomes smaller than threshold value WL and the warning state is therefore turned on.

Thus, in the conventional example, when the load state of battery B is high, the warning state is switched from off to on after electrically powered vehicle 100 starts an acceleration operation (time t3). Accordingly, the driver's intention for acceleration is temporarily satisfied, but the driver's intention for acceleration will be dissatisfied in the course of the acceleration operation.

Figure 4:
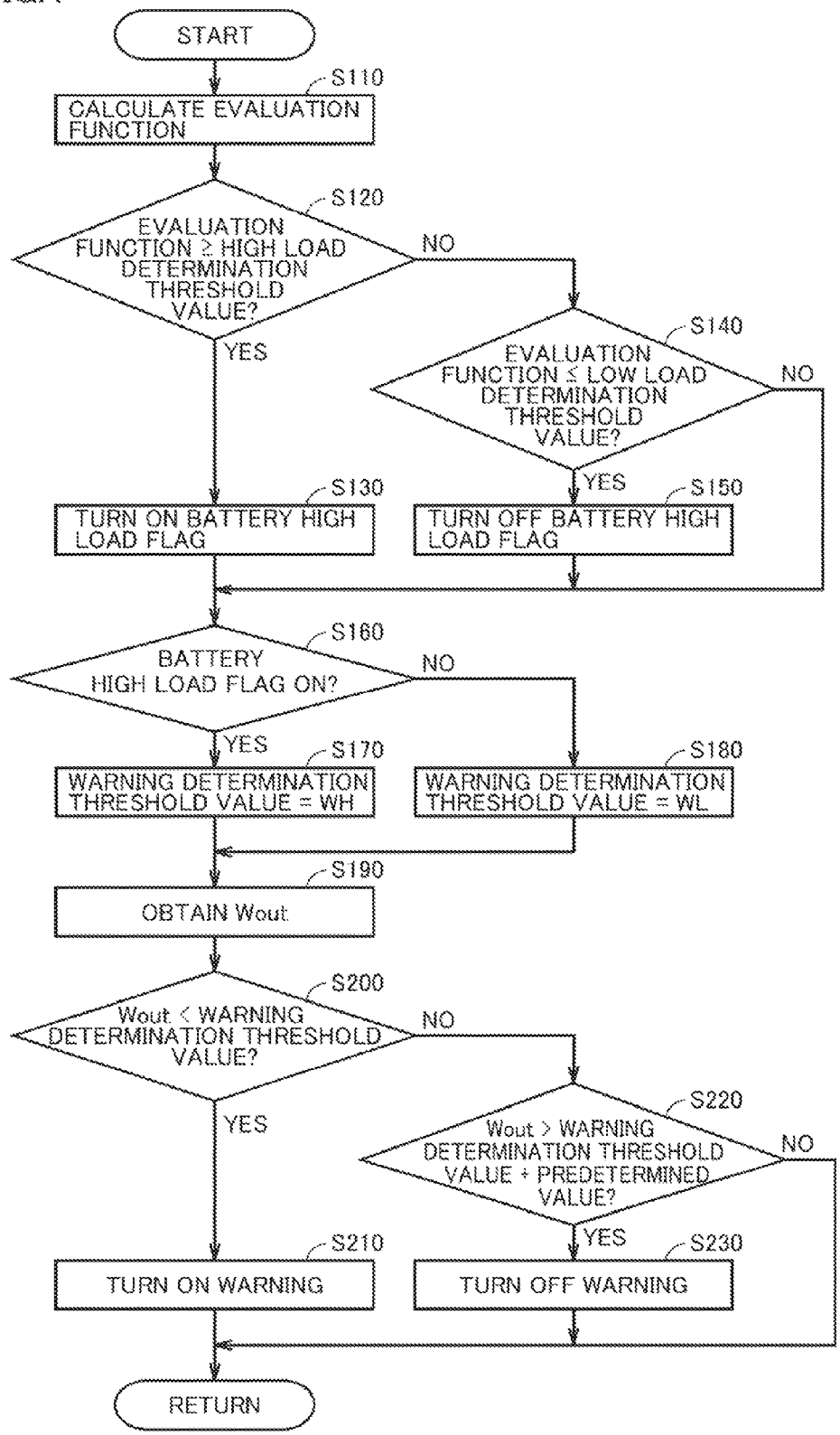
FIG. 4 is a flowchart showing a control structure of a program for the warning determination performed by the control device according to the first embodiment.

FIG. 4 is a flowchart showing a control structure of a program for the warning determination performed by control device 60 according to the embodiment. The processing routine in the flowchart is performed from the main routine whenever a certain time has passed or whenever a predetermined condition is satisfied.

Referring to FIG. 4, first, when the process is started, in a step (hereinafter, the word "step" will be abbreviated as "S") 110, control device 60 calculates an evaluation function based on the input/output current of battery B detected by current sensor 74.

Then, in S120, control device 60 determines whether or not the evaluation function calculated in S110 is equal to or more than high load determination threshold value SH. When affirmative determination is made in this process (YES in S120), the process proceeds to S130, in which the battery high load flag is turned on. On the other hand, if negative determination is made in S120 (NO in S120), the process proceeds to S140.

In S140, control device 60 determines whether or not the evaluation function calculated in S110 is equal to or less than low load determination threshold value SL. When affirmative determination is made in this process (YES in S140), the process proceeds to S150, in which the battery high load flag is turned off. On the other hand, when negative determination is made in S140 (NO in S140), the process proceeds to S160.

Then, in S160, control device 60 determines whether or not the battery high load flag is on. When affirmative determination is made in this process (YES in S160), the process proceeds to S170, in which the warning determination threshold value is set at high load threshold value WH. On the other hand, when negative determination is made in S160 (NO in S160), the warning determination threshold value is set at low load threshold value WL.

Then, in S190, control device 60 obtains possible output power Wout of battery B. Specifically, control device 60 calculates possible output power Wout of battery B based on the SOC, temperature, and the like of battery B. Then, based on the load state of battery B, control device 60 performs a limiting process to limit possible output power Wout of battery B.

Next, in S200, control device 60 determines whether or not possible output power Wout having been through the limiting process is less than the warning determination threshold value. When affirmative determination is made in this process (YES in S200), the process proceeds to S210, in which the warning state to be notified to the driver is turned on. On the other hand, when negative determination is made in S200 (NO in S200), the process proceeds to S220.

In S220, it is determined whether or not possible output power Wout is larger than a value obtained by adding a predetermined value to the warning determination threshold value. When affirmative determination is made in this process (YES in S220), the process proceeds to S230, in which the warning state is turned off. The predetermined value is a value set to prevent occurrence of unnecessary switching of the warning state between on and off.

As described above, in this first embodiment, when the load state of battery B is high, the warning determination threshold value for notifying the driver of the limitation on the traveling driving power is made larger than that in the case where the load state of battery B is low. Accordingly, when the load state of battery B is high, the driver can be notified in advance that the possible output power of battery B will be limited. Accordingly, according to the first embodiment, there can be provided an electrically powered vehicle that notifies a driver in advance that traveling driving power will be decreased due to a limitation on possible output power of battery B.

Further, in this first embodiment, the load state of battery B is determined based on the predetermined evaluation function indicating the state of battery B. Accordingly, the load state of battery B can be precisely evaluated.

Moreover, control device 60 calculates the evaluation function based on the input/output current of battery B. Accordingly, the load state of battery B can be determined in consideration of the change in the state of battery B by input/output current.

It should be noted that control device 60 may calculate the evaluation function based on the integrated value of the above-described input/output current. Accordingly, the load state of battery B can be more precisely determined by using the integrated amount of input/output current.

It should be noted that control device 60 may determine whether or not the load state of battery B is high, based on a plurality of evaluation functions for different subjects in the evaluation on the load state of battery B. In this case, control device 60 turns on the battery high load flag indicating the high load state, when one of the evaluation functions is equal to or more than high load determination threshold value SH. On the other hand, when all the evaluation functions are equal to or less than low load determination threshold value SL, control device 60 turns off the battery high load flag indicating the low load state. Accordingly, it can be determined more securely that battery B is in the high load state.

It should be noted that control device 60 may determine whether or not the load state of battery B is high, based on an amount of limitation on possible output power Wout of battery B. For example, control device 60 may determine that the load state of battery B is higher as the amount of limitation on possible output power Wout is larger. Accordingly, in consideration of the amount of limitation on possible output power Wout of battery B, the load state of battery B can be known more precisely.

It should be noted that control device 60 may determine whether or not the load state of battery B is high, based on a history of the amount of operation on the accelerator pedal. For example, control device 60 may determine that the load state of battery B is high when the accelerator pedal is highly frequently stepped greatly. Accordingly, in consideration of the driver's intention for acceleration, the load state of battery B can be known more precisely.

[Second Embodiment]

A second embodiment of the present invention is different from the first embodiment in that the warning determination threshold value is changed based on the evaluation function and the traveling driving power instead of the high load determination flag. In the second embodiment, by taking the traveling driving power into consideration, the amount of decrease in possible output power Wout during acceleration of electrically powered vehicle 100 is estimated and the warning determination threshold value can be changed. Accordingly, in consideration of the driver's driving characteristics, the driver can be notified in advance that the driving power will be decreased. It should be noted that the traveling driving power may be traveling driving power requested by the driver or may be actual traveling driving power. The traveling driving power requested by the driver may be calculated based on the amount of operation on the accelerator pedal and the vehicle speed. The actual traveling driving power may be calculated based on the rotational speed and output torque of motor generator 50, or may be calculated based on the output power of battery B. Further, the traveling driving power may represent the value of the traveling driving power at present, but more preferably represents a value obtained by averaging past traveling driving power during a predetermined time.

Figure 5:
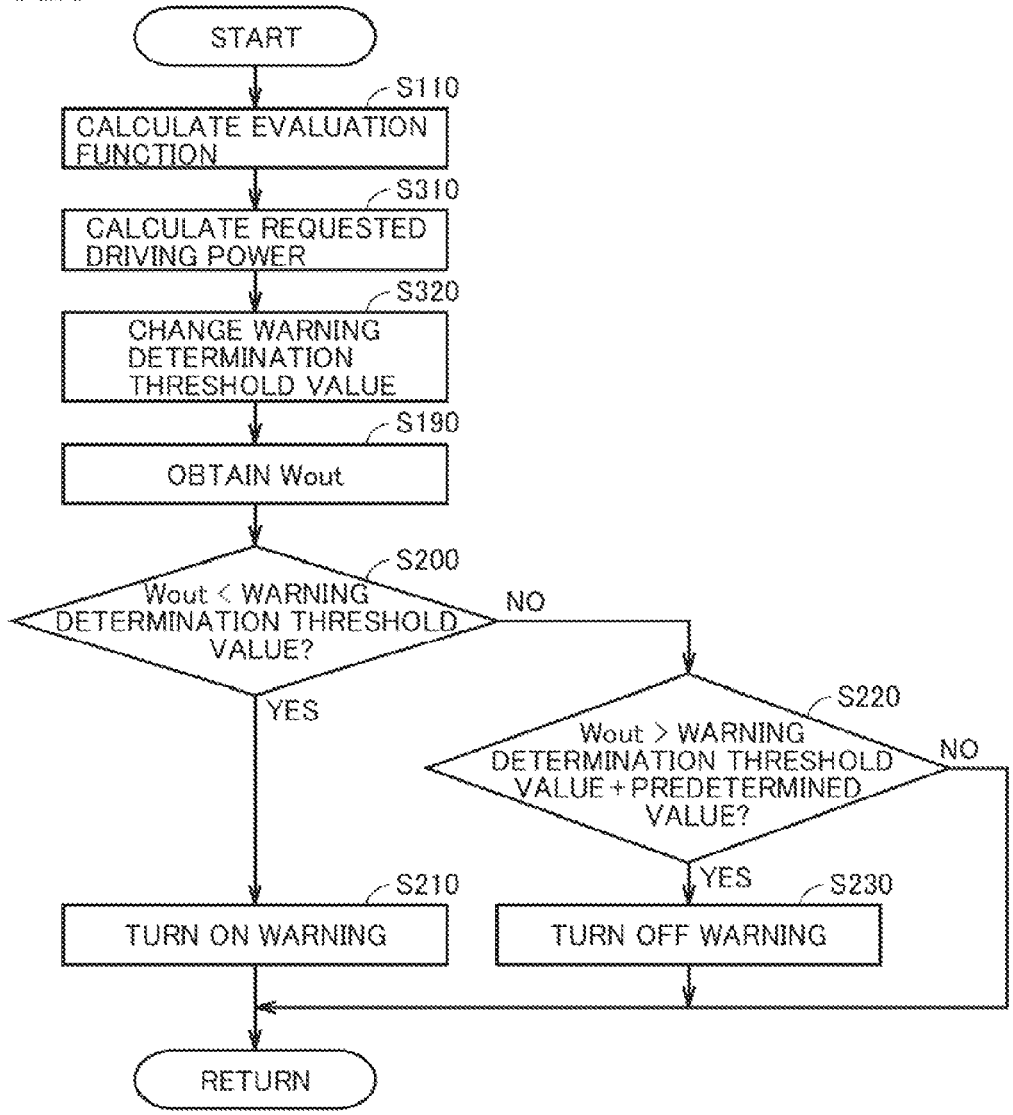
FIG. 5 is a flowchart showing a control structure of a program for the warning determination performed by the control device according to the second embodiment.

FIG. 5 is a flowchart showing a control structure of a program for the warning determination performed by control device 60 in this embodiment. The processing routine in the flowchart is performed from the main routine whenever a certain time has passed or whenever a predetermined condition is satisfied.

Referring to FIG. 5, S110, which is the same as that in the first embodiment, is not repeatedly described.

In S310, as one example, control device 60 calculates the requested driving power requested by the driver. Specifically, based on the history of the amount of operation on the accelerator pedal, the requested driving power requested when the driver performs the acceleration operation is learned. In other words, the requested driving power when the driver highly frequently performs sudden acceleration becomes larger than that in the case where the driver highly frequently performs gradual acceleration.

Then, in S320, based on the evaluation function calculated in S110 and the requested driving power calculated in S310, the warning determination threshold value is changed. Specifically, as shown in FIG. 6, there is prepared a map in which the warning determination threshold value is stored for each of the evaluation function and the requested driving power, and the map is stored in a memory of control device 60. By referring to the map, control device 60 obtains the warning determination threshold value. In the map shown in FIG. 6, when the requested driving power is large or when the evaluation function is large, the warning determination threshold value is set at high load threshold value WH, whereas when the requested driving power is small and when the evaluation function is small, the warning determination threshold value is set at low load threshold value WL.

Referring to FIG. 5 again, S190 to S230, which are the same as those in the first embodiment, are not repeatedly described.

As described above, in this second embodiment, based on the evaluation function and the traveling driving power, the warning determination threshold value is changed. Accordingly, by using the traveling driving power for change in the warning determination threshold value, the driver can be notified, in consideration of the driver's driving characteristics, that the possible output power of battery B will be limited. Therefore, according to the second embodiment, the driver can be informed more precisely in advance that the traveling driving power will be decreased due to the limitation on the possible output power of battery B.

It should be noted that control device 60 may employ a navigation system provided in electrically powered vehicle 100 so as to obtain, in advance, slope information about a road surface on which electrically powered vehicle 100 will travel, and may calculate the requested driving power based on the slope information. In this way, by using the slope information about the road surface on which it will travel, requested driving power can be estimated more precisely.

It should be noted that control device 60 may obtain the warning determination threshold value using a map different from the above-described map. Specifically, as shown in FIG. 7, control device 60 may use a map by which the warning determination threshold value is set at high load threshold value WH when the requested driving power is large and the evaluation function is large whereas the warning determination threshold value is set at low load threshold value WL when the requested driving power is small or the evaluation function is small.

Alternatively, as shown in FIG. 8, control device 60 may use a map set such that the warning determination threshold value becomes larger as the requested driving power is larger and the warning determination threshold value becomes larger as the evaluation function is larger. In other words, in the map shown in FIG. 8, warning determination threshold value C is set to be larger than warning determination threshold value A. Further, warning determination threshold value G is also set to be larger than warning determination threshold value A. In other words, control device 60 increases the warning determination threshold value more as the load state of battery B is higher.

It should be noted that in the above-described embodiments, the use of battery B has been illustrated, but a capacitor may be used instead of battery B.

Also, in the above-described embodiments, the use of the electric vehicle including motor generator 50 has been illustrated, but the present invention is not limited to such an electric vehicle and may be applied to a hybrid vehicle further including an engine, a fuel cell vehicle further including a fuel cell, and the like.

It should be noted that in the description above, battery B corresponds to one example of the "power storage device" in the present invention, and motor generator 50 corresponds to one example of the "motor" in the present invention. Moreover, Wout limitation control unit 104 corresponds to one example of the "limitation control unit" in the present invention, and threshold value changing unit 108 corresponds to one example of the "changing unit" in the present invention. Moreover, load state determining unit 102 corresponds to one example of the "determining unit" in the present invention, and the warning determination threshold value corresponds to one example of the "threshold value" in the present invention.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

30: boosting converter; 40: inverter; 50: motor generator; 55: driving wheel; 60: control device; 72: voltage sensor; 74: current sensor; 80: notification unit; 100: electrically powered vehicle; 102: load state determining unit; 104: limitation control unit; 106: traveling control unit; 108: threshold value changing unit; 110: warning determining unit; B: battery; Wout: possible output power.

The invention claimed is:

1. An electrically powered vehicle comprising:
a power storage device;
a motor that generates traveling driving power using electric power output from said power storage device;
a limitation control unit that limits allowable output power, which is electric power able to be output from said power storage device, based on a discharge load state of said power storage device;
a notification unit that notifies a driver of a decrease of said traveling driving power by generating a warning when said allowable output power is limited by the limitation control unit to a value smaller than a threshold power value for notifying the driver; and
a changing unit that increases, when the discharge load state of said power storage device is high, said threshold power value for notifying the driver to be larger than said threshold power value for notifying the driver when the discharge load state of said power storage device is low.

2. The electrically powered vehicle according to claim 1, further comprising a determining unit that determines the discharge load state of said power storage device based on a predetermined evaluation function indicating a state of said power storage device.

3. The electrically powered vehicle according to claim 2, wherein said evaluation function is an evaluation function that is based on an input/output current of said power storage device.

4. The electrically powered vehicle according to claim 3, wherein said evaluation function is an evaluation function that is based on an integrated value of said input/output current.

5. The electrically powered vehicle according to claim 1, further comprising a determining unit that determines the discharge load state of said power storage device based on said traveling driving power.

6. The electrically powered vehicle according to claim 1, further comprising a determining unit that determines the discharge load state of said power storage device based on a predetermined evaluation function, which indicates a state of said power storage device, and said traveling driving power.

7. The electrically powered vehicle according to claim 6, wherein said evaluation function is an evaluation function that is based on an input/output current of said power storage device.

8. The electrically powered vehicle according to claim 7, wherein said evaluation function is an evaluation function that is based on an integrated value of said input/output current.

9. The electrically powered vehicle according to claim 1, further comprising a determining unit that determines the discharge load state of said power storage device based on an amount of limitation on said allowable output power.

10. The electrically powered vehicle according to claim 1, further comprising a determining unit that determines the discharge load state of said power storage device based on said traveling driving power or a history of an amount of operation on an accelerator pedal.

11. The electrically powered vehicle according to claim 1, wherein said changing unit increases said threshold power value for notifying the driver more as the discharge load state of said power storage device is higher.

* * * * *